United States Patent [19]

Rudd

[11] Patent Number: 5,460,306
[45] Date of Patent: Oct. 24, 1995

[54] LOCKABLE FISHING ROD HOLDER

[76] Inventor: Craig A. Rudd, 6410 Brentford Dr., Springfield, Va. 22152

[21] Appl. No.: 223,655

[22] Filed: Apr. 6, 1994

[51] Int. Cl.⁶ ..................................................... B60R 9/08
[52] U.S. Cl. .................. 224/557; 224/922; 224/569; 224/571; 224/535; 224/537; 43/21.2; 248/552; 70/57
[58] Field of Search .............................. 224/922, 42.3 A, 224/281, 282, 42.45 R; 43/21.2; 248/551, 552, 534; 70/57, 58; 211/70.8

[56] References Cited

U.S. PATENT DOCUMENTS

| | | |
|---|---|---|
| 1,520,543 | 12/1924 | Meachen . |
| 2,598,021 | 5/1952 | Schwanke ............................ 224/922 |
| 2,995,855 | 8/1961 | Bell . |
| 3,870,259 | 3/1975 | Reynolds . |
| 4,198,775 | 4/1980 | Leisner ................................. 43/21.2 |
| 4,372,072 | 2/1983 | Comeau . |
| 4,676,019 | 6/1987 | Engles ................................... 43/21.2 |
| 4,827,654 | 5/1989 | Roberts ................................. 43/21.2 |
| 4,916,847 | 4/1990 | Rusgo ................................... 43/21.2 |
| 4,949,559 | 8/1990 | Glines ................................... 70/58 |
| 5,033,223 | 7/1991 | Minter . |
| 5,046,279 | 9/1991 | Smith et al. . |
| 5,121,565 | 6/1992 | Willie et al. .......................... 43/21.2 |
| 5,184,797 | 2/1993 | Hurner . |

OTHER PUBLICATIONS

A. J. Hand, Popular Science Magazine A locking case for your fishing rod, Sep. 1982, p. 126.

Primary Examiner—William A. Cuchlinski, Jr.
Assistant Examiner—Gregory M. Vidovich
Attorney, Agent, or Firm—Dennis H. Lambert

[57] ABSTRACT

A lockable fishing rod holder includes an elongate tubular member which may attached to the outside of a vehicle for supporting a fishing rod in a generally upright position, and a lockable sleeve rotatably engaged on the tubular member. The sleeve and tubular member have longitudinally extending slots therein which may be placed in registry with one another to permit the mounting bracket for the reel on the fishing rod to be moved through the slots lengthwise of the tubular member, and which may be placed out of registry with one another to prevent movement of the mounting bracket through the slots, thereby locking the fishing rod to the holder and preventing its unauthorized withdrawal from the holder. A lock may be engaged between the tubular member and sleeve to prevent relative rotational movement therebetween.

7 Claims, 5 Drawing Sheets

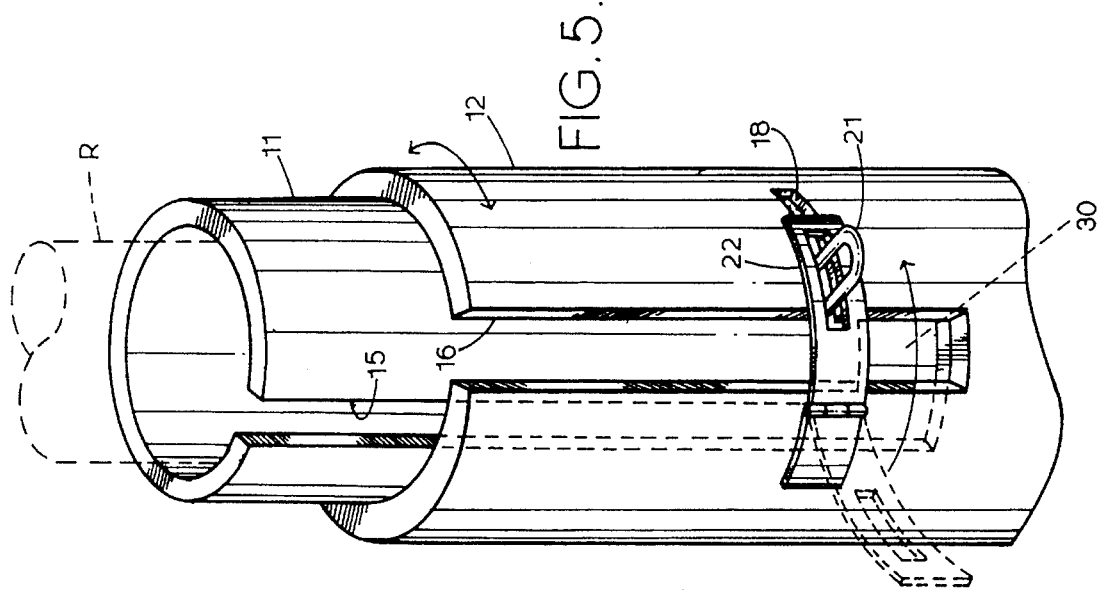
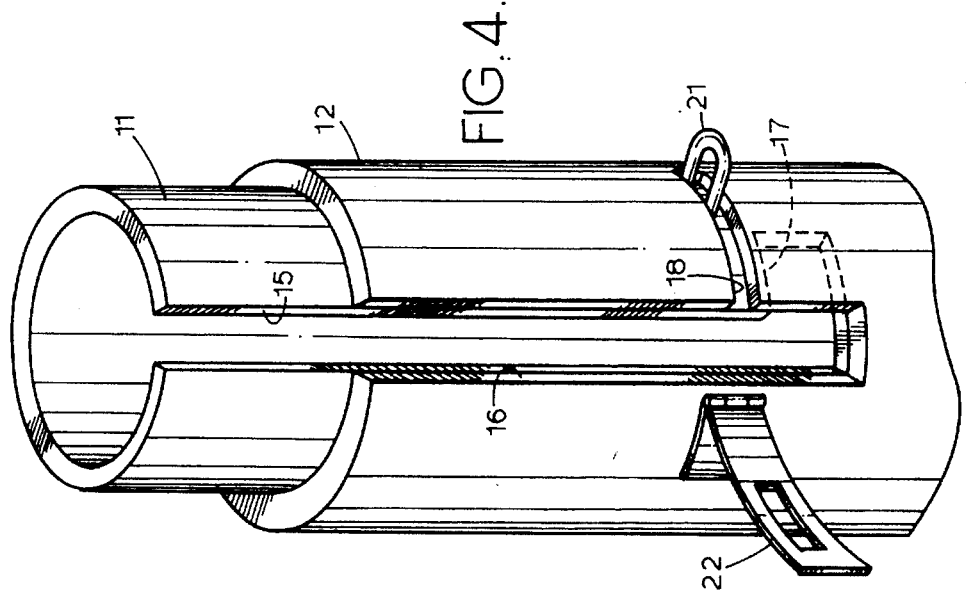

LOCKABLE FISHING ROD HOLDER

TECHNICAL FIELD

This invention relates generally to fishing rod holders. More specifically, the invention relates to a fishing rod holder that may be mounted on the front of a vehicle and used to hold a fishing rod, such as used in surf fishing, with means for locking the fishing rod in the holder to discourage theft of the fishing rod while it is unattended.

BACKGROUND ART

Many sport fishermen engage in the sport of surf fishing, using a relatively large surf fishing rod. These rods typically have a long handle, and when not in use the rods are sometimes stored in tubular holders attached to a bumper of a vehicle. While this provides a convenient way to store the rod when it is not in use, without having to disassemble the rod, it also leads to theft of the rod while it is unattended. In other words, the handle end of the rod is simply inserted into the tubular holder and no means is provided to secure it in place. Accordingly, it is a simple matter for someone to merely lift the rod out of its holder and take it when the owner of the rod is not in attendance.

Accordingly, there is need for a device that will not only conveniently hold a fishing rod without requiring it to be disassembled, but which will also securely lock the rod to the holder to prevent theft of the rod.

DISCLOSURE OF THE INVENTION

The present invention provides a simple and inexpensive means for securely and conveniently holding a fishing rod when not in use.

The fishing rod holder of the invention comprises an elongate tubular member that may be attached to the outside of a vehicle in position to receive the handle end of the fishing rod to support the fishing rod in a generally upright position. A cylindrical sleeve is rotatably engaged over the tubular member, and cooperating means on the sleeve and tubular member enable the fishing rod to be placed in the holder and removed therefrom, while also permitting the fishing rod to be locked in place in the holder when desired.

More specifically, the sleeve and tubular member both have elongate slots extending longitudinally through one end thereof. In one rotatably adjusted position of the sleeve on the tubular member, the slots are aligned with one another and the holder is in an "open" position so that the mounting bracket which attaches the reel on the fishing rod may be slid lengthwise through the slots for reception of the handle end of the fishing rod in the holder. In another rotatably adjusted position of the sleeve and tubular member, the slots are out of alignment with one another and the holder is in a "closed" position. One of the sleeve and tubular member has a lateral notch or opening at the inner end of the longitudinal slot, in which the bracket is received when the sleeve and tubular member are adjusted to their "closed" position, whereby removal of the fishing rod from the holder is prevented. A locking means may be associated with the sleeve and tubular member to secure them in their "closed" position and prevent unauthorized removal of the fishing rod from the holder.

BRIEF DESCRIPTION OF THE DRAWINGS

The foregoing, as well as other objects and advantages of the invention, will become apparent from the following detailed description and accompanying drawings, wherein like reference numerals indicate like parts throughout the several views, and wherein:

FIG. 4 is a greatly enlarged, fragmentary perspective view of the holder, showing how the longitudinal slots in the sleeve and tubular member are aligned when the holder is in its "open" position;

FIG. 5 is a greatly enlarged, fragmentary perspective view of the holder, with the holder in its "closed" position, and showing how the longitudinal slots are out of alignment to prevent withdrawal of the fishing rod from the holder;

BEST MODE OF CARRYING OUT THE INVENTION

Figure 1:
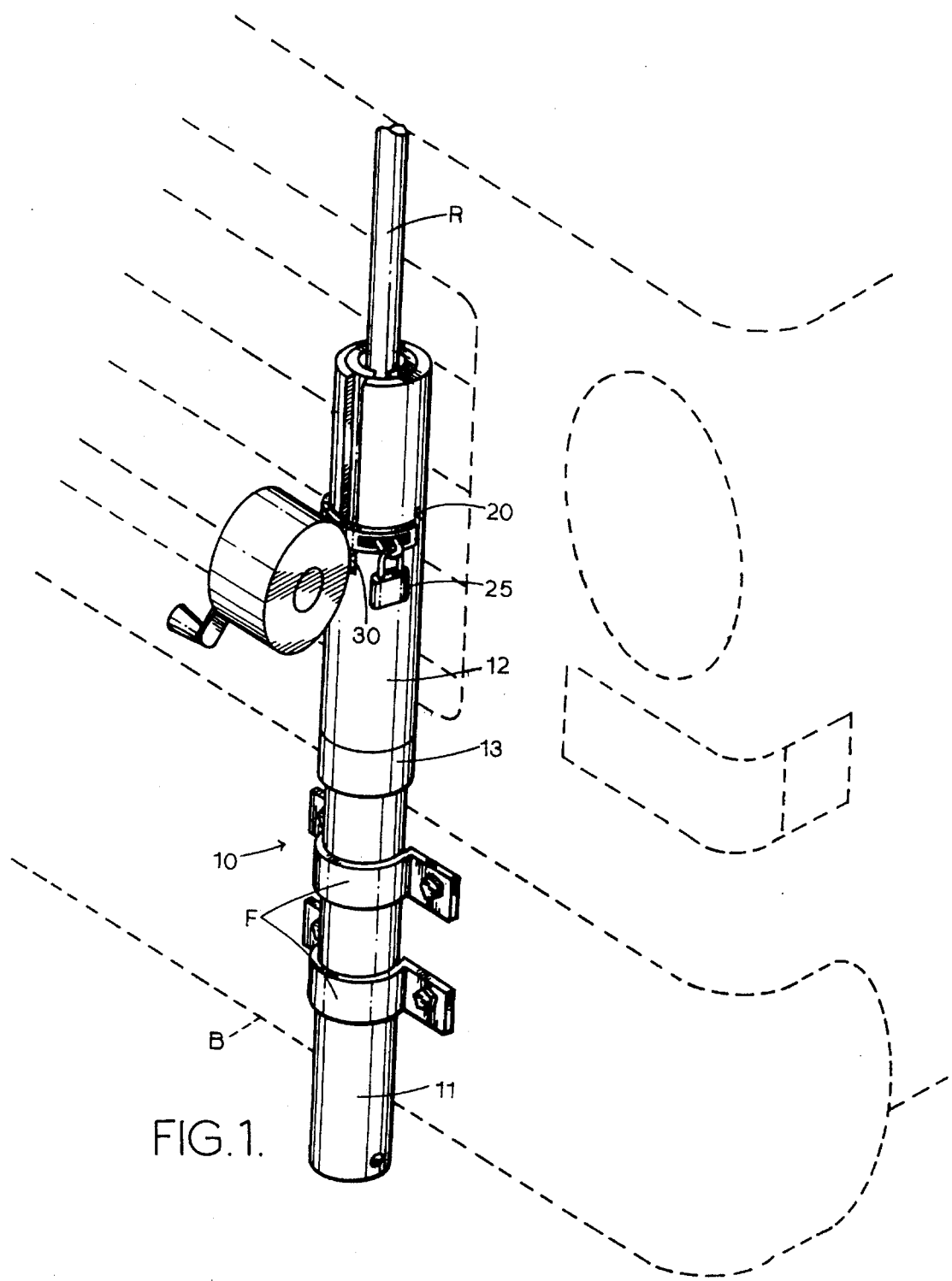
FIG. 1 is a top perspective view of a fishing rod holder according to the invention, shown secured to a vehicle and with a fishing rod supported therein.

Referring more particularly to the drawings, a fishing rod holder in accordance with the invention is indicated generally at 10 in FIG. 1, attached to the bumper B of a vehicle V by means of attaching brackets or fasteners F. A fishing rod R is held in the holder 10 for convenient storage of the rod without requiring it to be disassembled, and is secured against theft or unauthorized removal from the holder as described hereinafter.

The holder comprises an elongate, open-ended tubular member 11 with an open-ended sleeve 12 rotatably engaged thereon. The sleeve is shorter in length than the tubular member, and rests at its lower end on a collar 13 fixed on the outside of the tubular member approximately midway between its ends.

Figure 2:
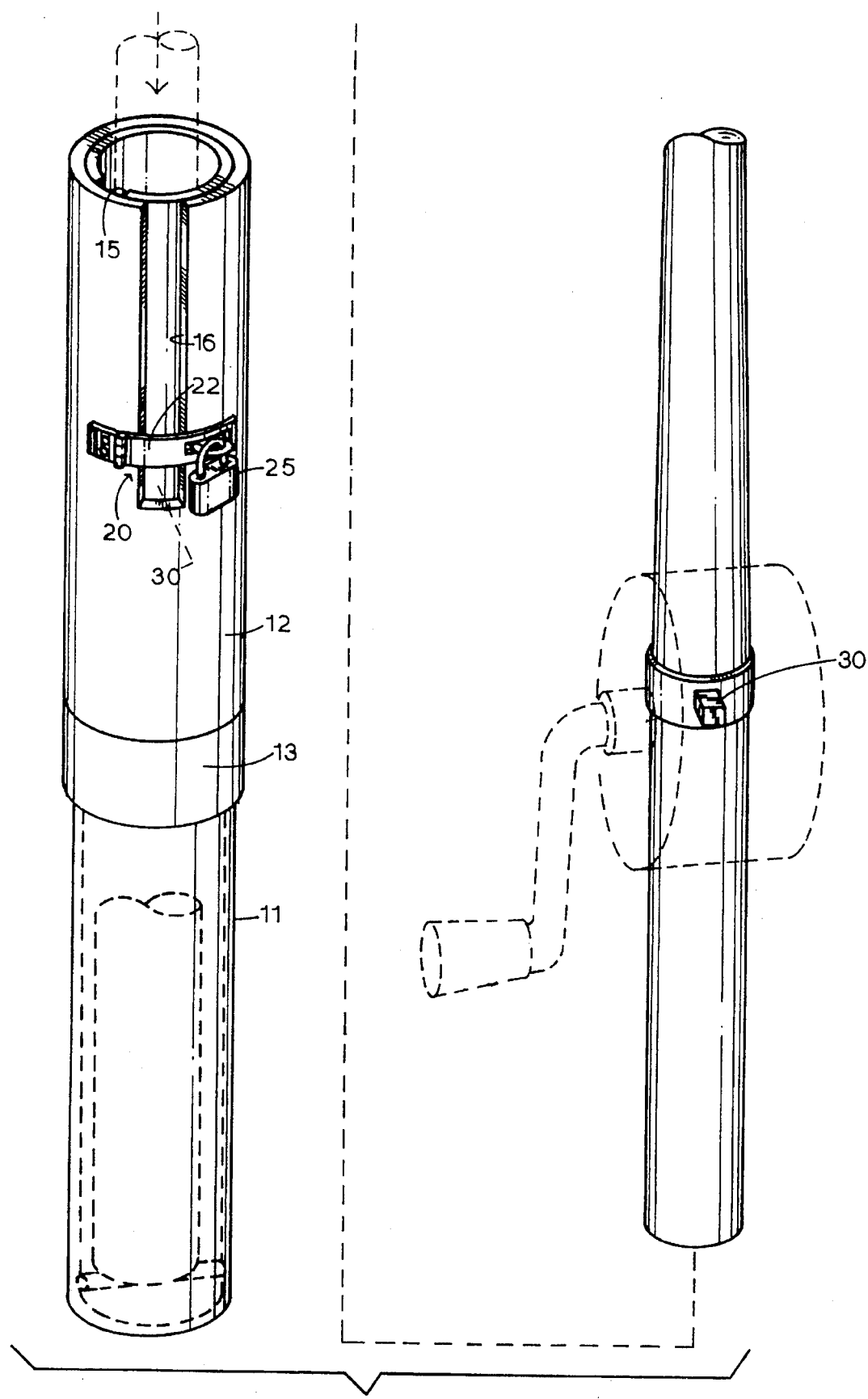
FIG. 2 is an enlarged, fragmentary, exploded top perspective view of the fishing rod holder and a fishing rod which may be held therein, showing the holder in its "closed" position.

The tubular member and sleeve have elongate, longitudinally extending slots 15 and 16 therein, respectively, extending through the open upper ends thereof. The tubular member and sleeve may be coterminous at their open upper ends as illustrated in FIGS. 1 and 2, or the tubular member may project beyond the sleeve as illustrated in FIGS. 4 and 5. The slots extend from the open upper ends of the tubular member and sleeve to an inner end intermediate the ends of the tubular member and sleeve. The inner ends of the slots are coterminous as seen in FIGS. 4 and 5, and in the embodiment shown, the slots extend approximately half the distance from the open upper end to the collar 13.

Figure 3:
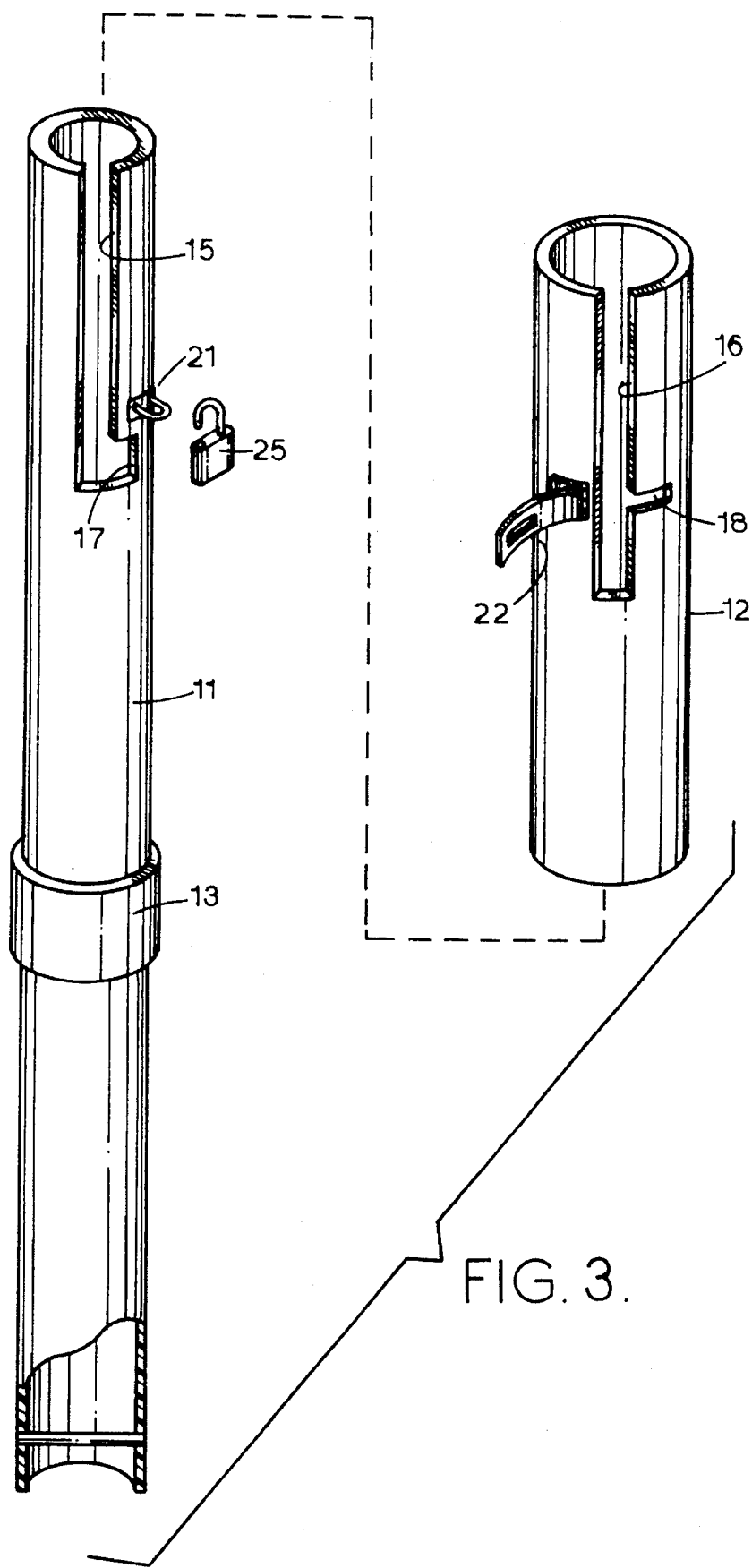
FIG. 3 is an exploded top perspective view of the holder, with the sleeve removed from the tubular member.
Figure 7:
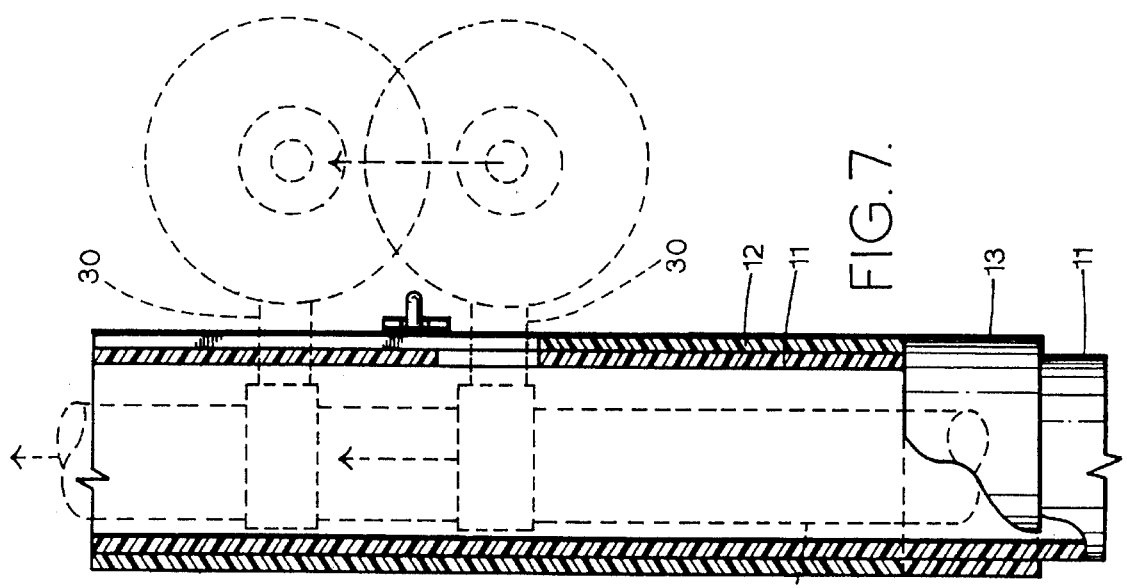
FIG. 7 is an enlarged longitudinal sectional view similar to FIG. 6, but showing the holder in its "open" position.
Figure 6:
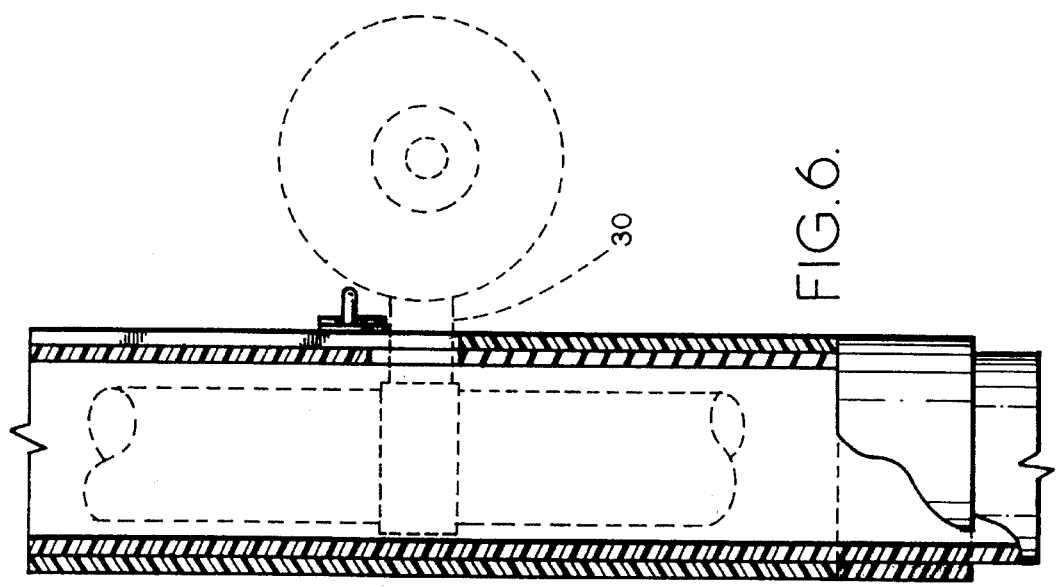
FIG. 6 is an enlarged longitudinal sectional view of the holder, taken along line 6—6 in FIG. 2.

As seen best in FIGS. 3, 4 and 5, the tubular member 11 has a relatively short, circumferentially extending notch 17 formed at the inner end of the notch 15, and the sleeve 12 has a narrow slot 18 extending circumferentially in the same direction from the slot 16, spaced slightly above the inner end of the slot and spaced slightly above the upper edge of the notch 17 (see FIG. 4) when the sleeve is resting at its lower end on the collar 13.

The sleeve 12 may be secured in locked position on the tubular member 11 to prevent relative axial and rotational movement therebetween, by locking engagement of hasp 20, comprising staple 21 secured on the tubular member 11 slightly above and circumferentially spaced beyond the distal end of notch 17, and clasp 22 secured on the sleeve at the side of slot 16 opposite the slot 18 and slightly above the notch 17. When the sleeve is assembled on the tubular member, the staple 21 on the tubular member extends through the notch 18 in the sleeve, and clasp 22 on the sleeve is movable into and out of operative engagement with the staple. A padlock 25 or the like may be used to lock the clasp in position closed over the staple.

A pin 26 or other means may be provided at the lower end of the tubular member to serve as a stop against which the butt end of the handle of the fishing rod rests when the fishing rod is supported in the holder.

With particular reference to FIGS. 4 and 5, the manner in which the slots, notches and hasp cooperate can be clearly seen. With the sleeve rotated to its "open" position as shown in FIG. 4, the longitudinally extending slots 15 and 16 are in alignment with one another, defining an open channel from the upper end of the holder to the lower ends of the slots. The staple 21 is extended through the narrow circumferential notch 18 near the closed end of the slot, and the notch 17 in the tubular member is hidden behind the wall of the sleeve. The clasp 22 is folded back out of the way. In this position, the reel mounting bracket 30 of the fishing rod may be slid along the channel defined by the slots 15 and 16 until the mounting bracket rests against the bottom of the slots, and/or the butt end of the handle rests on the pin 26. In this position, the bracket is aligned with the notch 17.

When the sleeve is rotated clockwise on the tubular member, the notch 17 moves into position to receive the bracket 30, and the slots 15 and 16 are out of alignment, thereby preventing withdrawal of the bracket 30 back through the slots. As a result, the fishing rod is locked in the holder (see FIG. 5). The clasp 22 may then be closed over the staple 21 and padlock 25 secured in the staple to prevent unauthorized opening of the holder.

The holder of the invention may be made of any suitable material and in any suitable dimensions. In one construction, the holder is made from PVC tubing, with the inner tubular member having one and one-half inch inside diameter, and the sleeve having two inch inside diameter. The holder in this example further has an overall length of about twenty seven inches, and the slots 15 and 16 extend inwardly along the lengths of their respective structures a distance of about six inches. Other materials, such as stainless steel, aluminum and the like may also be used, and other dimensions may be selected, depending upon the intended purpose.

Although the invention has been illustrated and described in detail herein, it is to be understood that various changes and modifications may be made therein without departing from the spirit and scope of the invention as defined in the appended claims.

What is claimed is:

1. A lockable fishing rod holder, comprising:

an elongate tubular member having an open upper end and a lower end and an elongate slot extending lengthwise from said open upper end to a section intermediate the ends of the tubular member;

an elongate, tubular sleeve having an open upper end and a lower end rotatable on the tubular member and having an elongate slot extending lengthwise from said open upper end to a portion intermediate the ends of the sleeve and substantially coterminous with the slot in the tubular member;

a notch extending circumferentially from the elongate slot in one of said sleeve and tubular member the elongate slot therein and extending therefrom;

said tubular member and sleeve having a first rotatably adjusted position relative to one another wherein the elongate slots therein are in aligned registry with one another, defining an axially extending channel through which a mounting bracket for a reel on a fishing rod is adapted to be slid lengthwise of the tubular member and sleeve for positioning of the bracket in the slots, and a second rotatably adjusted position relative to one another wherein the elongate slots therein are out of alignment with one another, and the bracket is received in the notch with a top edge of said notch defining a stop to prevent withdrawal of the bracket through the other of said slots, thereby trapping said bracket in said notch, whereby the fishing rod is adapted to be held in the holder to be supported thereby and secured against removal from the holder; and said holder further including a locking means, said locking means comprising a narrow, circumferentially extending slot extending from the elongate slot in said sleeve, and a laterally extending locking member in connection with the tubular member, said locking member extending through said circumferentially extending slot in said sleeve during both first and second positions for preventing relative axial movement between the sleeve and the tubular member.

2. A lockable fishing rod holder as claimed in claim 1, wherein:

said notch is formed in the tubular member; and a locking means is engaged between the sleeve and the tubular member, preventing relative axial movement between the sleeve and tubular member.

3. A lockable fishing rod holder as claimed in claim 2, wherein:

said locking means further comprising a clasp pivotally attached to said sleeve, said clasp adapted to pivotally engage said locking member when said tubular member and said sleeve are in said second position to prevent relative rotational movement between the tubular member and the sleeve.

4. A lockable fishing rod holder as claimed in claim 3, wherein:

the lower ends of both the tubular member and sleeve are open-ended; and a stop member is provided in the lower end of the tubular member to serve as a stop against which the butt end of the handle of the fishing rod rests when the fishing rod is supported in the holder.

5. A lockable fishing rod holder as claimed in claim 4, wherein:

the locking member comprises a staple through which a padlock is adapted to be engaged.

6. A lockable fishing rod holder as claimed in claim 1, wherein:

the tubular member and sleeve are made of PVC material.

7. A lockable fishing rod holder as claimed in claim 6, wherein:

a collar is secured on the tubular member to serve as a stop against which the sleeve rests when in position on the tubular member.

\* \* \* \* \*